United States Patent [19]

Haun et al.

[11] Patent Number: 5,068,208
[45] Date of Patent: Nov. 26, 1991

[54] SOL-GEL METHOD FOR MAKING GRADIENT INDEX OPTICAL ELEMENTS

[75] Inventors: Niels Haun, Rochester; Duncan T. Moore, Fairport, both of N.Y.

[73] Assignee: The University of Rochester, Rochester, N.Y.

[21] Appl. No.: 682,200

[22] Filed: Apr. 5, 1991

[51] Int. Cl.$^5$ ................................. C03C 3/04
[52] U.S. Cl. ......................... 501/12; 501/54; 501/65; 501/66; 501/67; 501/68; 65/31
[58] Field of Search .................... 501/54, 65, 66, 67, 501/68, 12, 900; 65/31

[56] References Cited

U.S. PATENT DOCUMENTS

| 3,938,974 | 2/1976 | Macedo et al. | 65/30.13 X |
| 4,302,231 | 11/1981 | Macedo et al. | 65/31 X |
| 4,686,195 | 8/1987 | Yamane | 501/12 |
| 4,731,348 | 3/1988 | Gonzales-Oliver | 501/54 X |
| 4,797,376 | 1/1989 | Caldwell et al. | 501/12 |
| 4,902,650 | 2/1990 | Caldwell et al. | 501/12 |

OTHER PUBLICATIONS

Gradient–Index Glass Rods of $PbO-K_2O-B_2O_3-SiO_2$ System Prepared by the Sol–Gel Process, Yamane et al., Journal of Non-Crystalline Solids 100 (1988), 506–510, North–Holland, Amsterdam.
r–GRIN $TiO_2-SiO_2$ Glass Rods Prepared by a Sol–Gel Method, K. Shingyouchi and S. Konishi, Electronics Letters, 9th Oct. 1986, vol. 22, No. 21, pp. 1108–1110.

Primary Examiner—Karl Group
Attorney, Agent, or Firm—Martin Lukacher

[57] ABSTRACT

Gradient-index glass is produced in a sol-gel process by utilizing water or a mixture of water and alcohol. This technique is particularly suitable for production of glass bodies with a ternary system of metal alkoxides, including silicon alkoxide, an index modifying metal alkoxide, such as alkoxides of titanium and zirconium, and an additional metal alkoxide, such as an alkoxide of aluminum, boron, or germanium.

20 Claims, 2 Drawing Sheets

SOL-GEL METHOD FOR MAKING GRADIENT INDEX OPTICAL ELEMENTS

FIELD OF THE INVENTION

This invention relates to a method of making optical elements from an alkoxide-containing mixture in which the index of refraction profile can be varied without modifying acid leaching conditions or changing the initial composition of the mixture. The invention is particularly suitable for making gradient-index glass with three or more constituents, such as a ternary system formed from a silicon alkoxide, a titanium alkoxide, and an aluminum alkoxide.

BACKGROUND OF THE INVENTION

Gradient-index glass is often made in the form of solid cylindrical bodies. The index of such bodies changes radially, usually with the highest index being along the axis of the cylinder and the lowest index located at the outer periphery.

Generally, the profile of a radial gradient-index glass can be mathematically expressed in terms of the following formula $$n = N_{00} + N_{10}r^2 + N_{20}r^4 \ldots,$$

where:

n is the refractive index, r is the radial distance from the axis of the glass to its periphery, and $N_{00}$, $N_{10}$, and $N_{20}$ are constants. Parabolic gradient profile shapes are particularly desirable for gradient-index glass used in lenses, and, for such configurations, the above formula simplifies to the following:

$$n = N_{00} + N_{10} r^2.$$

In defining the profile shape of gradient-index glass, the $N_{10}$, $\Delta n$, and % $\Delta n$ due to $N_{10}$ (i.e., ($N_{10}$ $r^2$periphery/$\Delta n$)$\times 100$) parameters are particularly important. $\Delta n$ is defined as the difference between the refractive index at the periphery and the axis of the glass. For a parabolic glass configuration, $\Delta n$ is $N_{10}(r^2$ pheriphery-$r^2$axis), where $r$axis is zero. The power contribured by gradient-index glass is dictated by the value of $N_{10}$, with $N_{10}$ values less than 0 indicating a positive power. The more negative $N_{10}$ is, the more positive power is introduced. The %$\Delta n$ due to the $N_{10}$ term is a primary indicator of the parabolic character of a particular gradient-index glass. As the %$\Delta n$ due to the $N_{10}$ term approaches 100%, the particular glass assumes a more parabolic configuration.

The use of gradient-index glass in optical elements provides many advantages over homogeneous glass bodies in which the index is constant. For example, a single gradient-index glass element provides the performance of multiple element lenses and reduces the volume of the body. The applications for gradient-index glass have, however, been limited by the lack of suitable materials and of suitable production techniques. For example, the limitations of ion exchange processes relate to size, environmental and thermal stability, index profile dispersion, base index (i.e., $N_{00}$), and maximum $\Delta n$.

Historically, gradient-index glass has been made with silicate preforms. See, e.g., U.S. Pat. Nos. 3,938,974 and 4,302,231. These preforms are fabricated either by leaching a phase separated glass or by sol-gel methods. Such techniques involve creating and then fixing into place a concentration gradient of refractive index modifying dopants within the porous preform. The preform is then dried and heated until it becomes a pore-free glass element with an index gradient. The sol-gel and other techniques are reviewed in U.S. Pat. No. 4,686,195 to Yamane.

Gradient-index glass prepared by diffusion in inorganic oxide gel monoliths is proposed by Mukherjee, S.P., "Gradient Index Lens Fabrication Processes: A Review, in Topical Meeting on Gradient-Index Optical Imaging Systems," Honolulu, Hawaii, Optical Society of America (1981), pages Tu Al-1 to Tu Al-5. This paper identifies the following potential advantages of using sol-gel precursors in the production of gradient-index glass: (1) relatively large diffusion coefficients; (2) low energy consumption during most of the process; and (3) the ability to introduce a broad variety of index-modifying dopants into the sol-gel preform.

U.S. Pat. No. 4,686,195 to Yamane produces gradient-index glass by a sol-gel technique. This technique involves mixing a silicon alkoxide with water, a source of boron oxide, and an aqueous metal salt solution which is the source of modifier cations. This mixture forms a gel which then is placed in a solution to leach out some of the metal salts contained within it and to have other metal salts introduced into it by diffusion. The gel is then dried and sintered into glass. M. Yamane et. al, "Gradient-Index Glass Rods of $PbO$-$K_2O$-$B_2O_3$-$SiO_2$ System Prepared by the Sol-Gel Process," *Journal of Non-Crystalline Solids*, 100, 506–10 (1988) discloses a similar process in which the concentration gradient index of cations is fixed by a reprecipitation mechanism in acetone or iso-propanol.

Shingyouchi et al., *Electronics Letters*, 22:99–100, 1108–1110 (1986), utilizes germanium alkoxide as the index modifying cation. The index modifier is thus fully incorporated into the gel structure, and the index profile does not suffer from uncontrollable asymmetry.

First, tetramethoxy silane (a silicon alkoxide) is combined with tetraethoxy germanium (a germanium alkoxide), ethanol, water, and hydrochloric acid. The mixture forms a gel which is placed in water to leach out some of the germanium component. The gel is then washed in methanol to fix the germanium concentration gradient, dried, and sintered into gradient-index glass. Shingyouchi et al. also uses titanium to replace germanium as the index modifying cation. The resulting glass is a 2mm diameter rod with a $\Delta n$ of −0.013.

The method of Shingyouchi et al. involves the use of only two components: silica and an index modifying oxide, such as germanium dioxide or titanium dioxide. The method can be generalized to substitute zirconium dioxide as well. These binary systems, however, yield gels with decreased porosity, making them difficult to dry and sinter without fracturing or bloating. The $SiO_2$/$TiO_2$ binary system tends to crystallize at elevated temperatures if the $TiO_2$ content tend to bloat at elevated temperatures, because the outside portions of the gel collapse before the inside portions, thereby trapping any released gases.

U.S. Pat. Nos. 4,797,376 and 4,902,650 to Caldwell et al. disclose a sol gel method for producing gradient index glass in a ternary system. This process is initiated by forming a mixture of silicon alkoxide and alcohol in an aqueous solution sufficiently acidic to partially hydrolyze the silicon alkoxide. An index modifying metal alkoxide, an additional metal alkoxide, and water are then added to the mixture. This converts the metal alkoxides to a network of corresponding metal oxides suitable for gelation A gel is then formed by molding the mixture containing the network of metal oxides. The gel is acid leached, fixed in alcohol, dried, and sintered to a transparent gradient index glass.

SUMMARY OF THE INVENTION

The present invention relates to an improvement over the sol-gel process of U.S. Pat. Nos. 4,797,376 and 4,902,650 to Caldwell et al. Specifically, by fixing the gel produced by the process of Caldwell in water or a mixture of alcohol and water, instead of pure alcohol, it has been discovered that a variety of $\Delta n$ values can be achieved for a particular profile. In addition, gradient-index glass with many different profiles can be produced, for a gel system having a particular chemical composition, without adversely affecting $\Delta n$.

As in Caldwell, the process of the present invention starts with an alkoxide of silicon and adds at least one additional, different metal alkoxide to form a mixture. The additional alkoxide is an alkoxide of titanium or zirconium which acts as an index modifier. Although a mixture of 2 alkoxides can be utilized, a ternary system, containing a third alkoxide, is particularly advantageous. This third alkoxide acts as a gel modifier and can be an alkoxide of boron, aluminum, or germanium. Mixtures containing yet other alkoxides are also useful.

The alkoxide mixture is allowed to gel. The gel is washed, leached, fixed, dried, and then sintered to form a glass.

Aqueous fixing solutions with a wide range of alcohol concentrations can be utilized—i.e., 0 volume % up to (but not including) 100 volume % alcohol. It is particularly preferred, however, to fix in a solution containing 5 to 60 volume % alcohol where it is sought to maximize $\Delta n$. A fixing solution containing 0 to 40 volume % alcohol is useful in forming gradient-index glass with a substantially parabolic profile. Solutions having 20 to 40 volume % alcohol tend both to maximize $\Delta n$ and to produce a substantially parabolic shape.

The use of fixing baths containing a wide range of alcohol-water mixtures or water alone permits great specification flexibility in the production of glass bodies compared to prior art processes. Specifically, the prior art's utilization of a pure alcohol fixing bath permitted $\Delta n$ values and profiles to be changed, for a glass formed from a particular blend of alkoxides, only by modifying acid leaching times. However, increases in acid leaching time to achieve a satisfactory profile lowered $\Delta n$ to a value below practical utility. Moreover, for a particular glass composition, only one profile could be achieved at a $\Delta n$ value.

By contrast, the present invention's use of a fixing bath formulated from either a mixture of alcohol and water or water alone yields glass bodies having a variety of $\Delta n$ values and profiles. No variation in acid leach time or glass composition is needed. By additionally varying acid leaching times, a wide variety of $\Delta n$ values and glass profiles can be obtained for a glass system of a particular composition.

DETAILED DESCRIPTION OF THE INVENTION AND DRAWINGS

Figure 1:
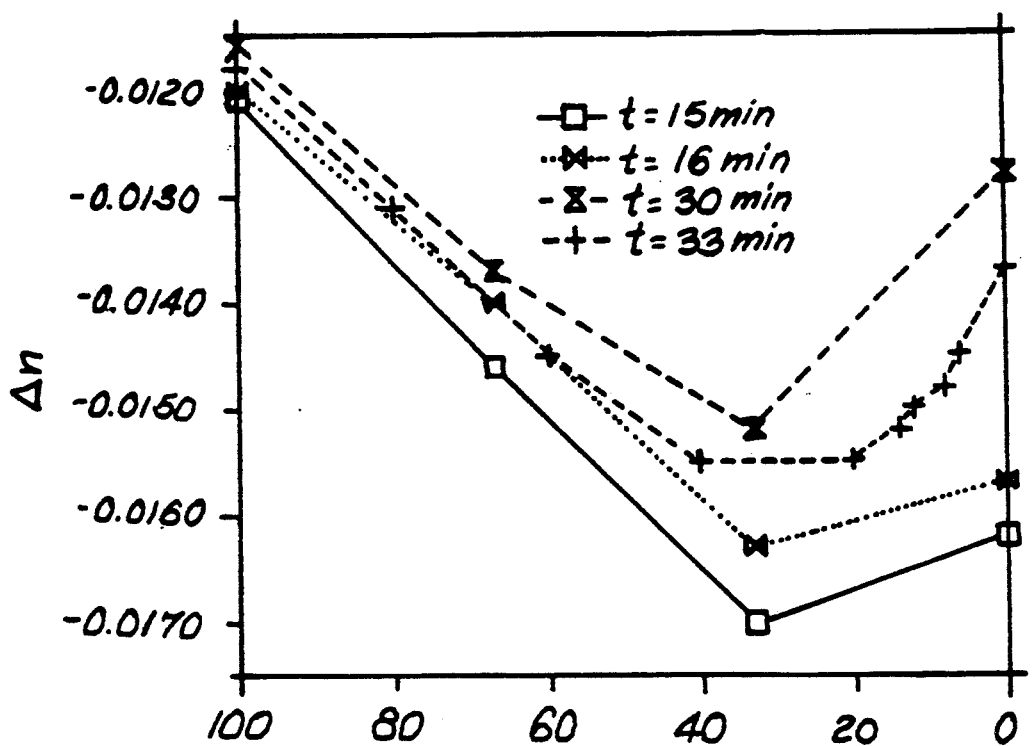
FIG. 1 is a plot of $\Delta n$ versus the volume percentage of methanol in the fixing bath as a family of curves, each for a different acid leaching time, for a titanium alkoxide:aluminum alkoxide:silicon alkoxide gel system having an initial molar ratio of 0.05:0.10:0.85, respectively.

The process of the present invention relates to an improved sol-gel process for producing gradient-index glass.

In accordance with an embodiment of the present invention, an alkoxide of silicon, diluted with alcohol, is partially hydrolyzed by adding a small amount of slightly acidic water. This use of silicon alkoxide provides $SiO_2$ to the gel which is the chosen glass former for this system.

After partial hydrolysis, at least one additional, different metal alkoxide is added. The additional alkoxide acts as an index modifier or dopant. Alkoxides of titanium or zirconium are suitable for this purpose.

It is particularly desirable to add a third alkoxide, which functions as a gel modifier. This can be an alkoxide of boron, aluminum, or germanium. Other additional alkoxides can be added to produce a system that is of higher order than ternary.

The addition of an aluminum alkoxide furnishes $Al_2O_3$ to the gel. Gels containing $Al_2O_3$ tend to have a lower density and a coarser microstructure when dried. The coarse structure makes the dry gel more resistant to fracture during heating and allows gaseous reaction products formed during sintering to flow freely out of the gel, thus preventing bloating. The presence of $Al_2O_3$ tends to increase the temperature at which the gel collapses into glass. As a result, reactions which cause bloating are more likely to be completed before the gel collapses. When present in a gel containing $TiO_2$, $Al_2O_3$ helps to reduce the rate of crystallization and increases the temperature at which crystallization occurs.

The addition of a boron alkoxide provides the gel with $B_2O_3$. The presence of $B_2O_3$ eliminates bloating which occurs during the leaching stage by lowering the sintering temperature of the center of the gel relative to outer portions of the gel. As a result, the center will sinter first and release gases to prevent them from being trapped within the collapsing gel. Also, $B_2O_3$ substantially reduces the tendency of a gel containing $TiO_2$ or $ZrO_2$ to crystallize at high temperature.

The use of germanium alkoxides furnishes $GeO_2$ which performs a function similar to $B_2O_3$, but also significantly contributes to the total index change.

Tetramethoxy silane ("TMOS") is the preferred silicon alkoxide. The preferred source of $B_2O_3$ is triethyl borate or tributyl borate. The preferred sources of $GeO_2$, $ZrO_2$, and $TiO_2$ are the ethoxides, propoxides, or butoxides of germanium, zirconium, and titanium. The preferred source of $Al_2O_3$ is aluminum di(sec-butoxide) acetoacetic ester chelate. The metal oxides ($SiO_2$, $TiO_2$, $ZrO_2$, $Al_2O_3$, and $GeO_2$) are formed from their corresponding metal alkoxides by hydrolysis and polycondensation reactions. These reactions lead to the formation of a highly porous oxide gel.

The amount of $SiO_2$ in the gel should be between 60 and 98 mole percent. Amounts below 60% result in a gel which is too weak to withstand all of the processing steps. Amounts greater than 98% will not achieve useful refractive index changes.

For gels incorporating $TiO_2$ as the main index modifier, the amount of $TiO_2$ in the gel should be at least 0.1 mole percent but less than 25 mole percent. For gels incorporating $ZrO_2$ as the main index modifier, the amount of $ZrO_2$ should also be at least 0.1 mole percent but less than 25 mole percent. Gels containing more than 25% $TiO_2$ or $ZrO_2$ tend to dissolve during the leaching stage or crystallize during the sintering stage.

When $B_2O_3$, $Al_2O_3$, or $GeO_2$ are used as gel modifiers, the amount of $B_2O_3$ should be less than 10 mole percent, the amount of $Al_2O_3$ should be between 1 and 25 mole percent, and the amount of $GeO_2$ should be less than 20 mole percent.

A mixture of silicon alkoxides, titanium alkoxides, and aluminum alkoxides is one preferred embodiment of the present invention. It is desirable to mix these alkoxides in amounts which will ultimately form a gradient-index glass containing 89 to 98 mole % $SiO_2$, 0 to 5 mole % $\frac{1}{2}(Al_2O_3)$, and 0.1 to 6 mole % $TiO_2$. A ratio of 85 mole % $SiO_2$, 10 mole % $\frac{1}{2}(Al_2O_3)$, and 5 mole % $TiO_2$ is particularly useful.

After a mixture of a silicon alkoxide, an index modifying metal alkoxide, and at least one additional metal alkoxide element is prepared, it is stirred and diluted with water to convert the metal alkoxides to a network of the corresponding metal oxides suitable for gelation. The mixture containing the network of metal oxides is then placed in a mold and allowed to set for sufficient time to form a gel. Once gelled, the mixture is aged at 20 to 100° C., preferably 50° C., for a time period of one hour to several weeks.

After aging, the gel is washed with water to remove alcohols or any additives used in the gel forming process. Such washing can be repeated several times, if needed, to achieve this objective. As a result of such washing, more desirable profile shapes are achieved in the resulting glass.

The washed gel is then placed in an acid leaching bath for a period of 15 minutes to 6 hours, preferably 16 minutes to leach out some of the index modifying dopant from the gel. Generally, acid leaching is carried out at 0 to 90° C., preferably 21° C. The acid leaching bath contains water and a strong acid, such as hydrochloric acid, sulfuric acid, nitric acid, or mixtures thereof.

Next, the gel is placed in a fixing bath to arrest leaching. The fixing bath can contain only water or a mixture of water and an alcohol containing 1-4 carbon atoms. Particularly suitable alcohols are methanol and ethanol. Wide ranges of the fixing agents can be utilized. Specifically, fixing baths containing from 0 volume % up to, but not including, 100 volume % alcohol are suitable. To achieve maximum $\Delta n$ values, the fixing bath should contain an aqueous solution of 5 to 60 volume percent alcohol. Substantially parabolic configurations are produced when the fixing bath contains an aqueous solution of 0 to 40 volume percent alcohol. The combination of a substantially parabolic configuration and maximum $\Delta n$ values are achieved with a fixing bath formed from an aqueous solution of 20 to 40 volume percent alcohol.

The fixed gel is dried to produce a porous oxide body with a greater percentage of index modifying dopants at its center than at its edge. Drying can be carried out at 21 to 100° C., preferably 50° C., for at least two days, preferably three days, depending on the size of the gel.

The dried gel is sintered into a transparent gradient-index glass by heating the gel to a temperature between 800 to 1600° C. for a period of 8 to 24 hours, preferably 20.5 hours. One suitable sintering schedule comprises heating by 30° C. per hour to 600° C. in air, heating by 50° C. per minute to 1100° C. in oxygen, heating by 20° C. per minute to 1500° C. in helium, holding for three minutes, and cooling to room temperature.

EXAMPLES

The following examples are illustrative of the present invention.

EXAMPLE 1

15.63 ml of dimethyl formamide, 15.63 ml of methanol, 9.68 ml of tetramethyl orthosilicate, and 1.18 ml of an 0.1 M aqueous solution of hydrochloric acid were stirred together for 15 minutes. 1.15 ml of titanium isopropoxide and 2.33 grams of aluminum di(sec-butoxide) acetoacetic ester chelate then were added and the mixture was stirred for 1 hour. 4.39 ml of water then was added and the mixture was stirred for 5 minutes. 4 ml of the resulting solution was poured into each of eleven 11 mm diameter × 50 mm polypropylene test tubes which were immediately capped. The solution inside the test tubes formed a stiff gel within 3 hours at room temperature. The gels were kept closed inside the test tubes while they were aged for 2 ½ days at 50° C.

The gels were then placed into glass test tubes containing 50 ml of water. The glass test tubes were rotated end over end to provide agitation. The water was replaced with fresh water two more times in 24 hour intervals. The gels then were placed into 50 ml of 3 M sulfuric acid for 15 minutes during which time the test tubes were still rotated end over end. The acid was removed, and the gels were fixed in 50 ml of fixing solution (i.e., 100 volume % methanol in this example) while the test tubes were rotated. The solution was replaced with fresh solution after 24 hours. 24 hours later, the gels were washed in pure methanol. The methanol was removed from the test tubes and the gels were dried in the test tubes in an oven at 50° C. for 1½ days.

Next, the gels were heated at 30° C. per hour to 600° C. in air, then 50° C. per minute to 1100° C. in an oxygen atmosphere, then at 20° C. per minute to 1485° C. in a helium atmosphere. The resulting glass rods were removed from the furnace and cooled to room temperature.

The resulting rod was 3.7 mm in diameter and about 13 mm long. It was transparent, free from defects, and had a total index change of −0.0111.

The process of Example 1 was repeated for Examples 2 to 23 with the acid leaching time and the volume % of methanol in the aqueous fixing solution varied, as set forth below in Table 1, to produce the $\Delta n$ values shown in Table 1.

TABLE 1

| Example | Acid Leaching Time (minutes) | Volume % Methanol in Aqueous Fixing Solution | $\Delta n$ |
|---|---|---|---|
| 2 | 15 | 67 | −0.0146 |
| 3 | 15 | 33 | −0.0170 |
| 4 | 15 | 0 | −0.0165 |

TABLE 1-continued

| Example | Acid Leaching Time (minutes) | Volume % Methanol in Aqueous Fixing Solution | $\Delta n$ |
| --- | --- | --- | --- |
| 5 | 16 | 100 | −0.0108 |
| 6 | 16 | 67 | −0.0126 |
| 7 | 16 | 33 | −0.0158 |
| 8 | 16 | 0 | −0.0157 |
| 9 | 30 | 100 | −0.0118 |
| 10 | 30 | 80 | −0.0131 |
| 11 | 30 | 60 | −0.0145 |
| 12 | 30 | 40 | −0.0155 |
| 13 | 30 | 20 | −0.0149 |
| 14 | 30 | 14 | −0.0144 |
| 15 | 30 | 12 | −0.0145 |
| 16 | 30 | 10 | −0.0133 |
| 17 | 30 | 8 | −0.0136 |
| 19 | 30 | 0 | −0.0131 |
| 20 | 33 | 100 | −0.0119 |
| 21 | 33 | 67 | −0.0137 |
| 22 | 33 | 33 | −0.015 |
| 23 | 33 | 0 | −0.0128 |

The rods produced by Examples 1-23 were analyzed with an interferometer to produce refractive index (n) versus rod radius plots for each example, like those in FIG. 1 of U.S. Pat. Nos. 4,797,376 and 4,902,650 to Caldwell et al. A curve of the formula $n = N_{00} + N_{10}r^2 + N_{20}r^4 \ldots$ was then fitted to each of these plots. From these curves, values for $N_{10}$, $\Delta n$, and % $\Delta n$ due to $N_{10}$ could be determined for each example. Utilizing these parameters for Examples 1-23, the curves of FIGS. 1-3 were prepared for various leaching times.

A plot of $\Delta n$ versus the volume percentage of methanol in the fixing bath as a family of curves, each for a different acid leaching time, for a titanium alkoxide:aluminum alkoxide:silicon alkoxide gel system having an initial molar ratio of 0.05:0.10:0.85, is found in FIG. 1. This plot shows that maximum index change (i.e., the most negative $\Delta n$ values) are not only achieved with decreased acid leaching times but also with fixing baths containing an aqueous solution of 20 to 40 volume percent methanol, preferably 33 volume percent methanol, for a glass system of this particular composition. Such fixing baths yield $\Delta n$ values in this system of −0.0155 to −0.0170. This constitutes a significant improvement over the small index change achieved through the prior art's use of a 100% methanol fixing bath —i e., $\Delta n$ values of −0.0108 to −0.0119 (see examples 1, 5, 9, and 20). Moreover, virtually any other $\Delta n$ value on the curves of FIG. 1 is greater than those achieved with a 100% methanol fixing bath.

Figure 2:
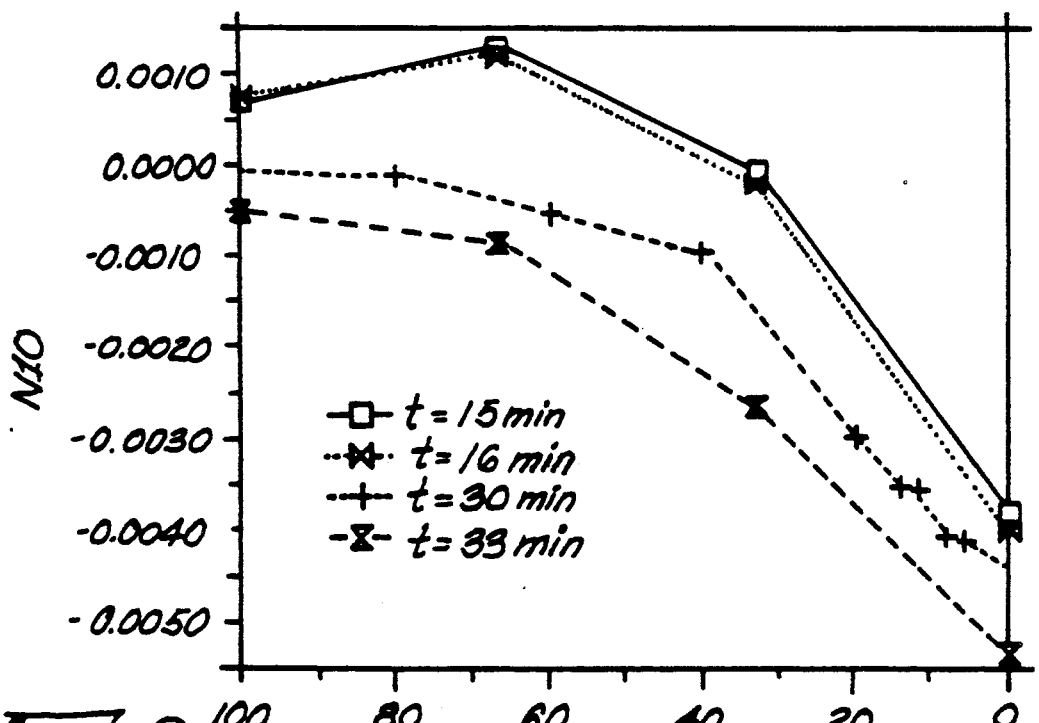
FIG. 2 is a plot of $N_{10}$ versus the volume percentage of methanol in the fixing bath as a family of curves, each for a different acid leaching time, for a titanium alkoxide:aluminum aloxide:silicon alkoxide gel having an initial molar ratio of 0.05:0.10:0.85, respectively.
Figure 3:
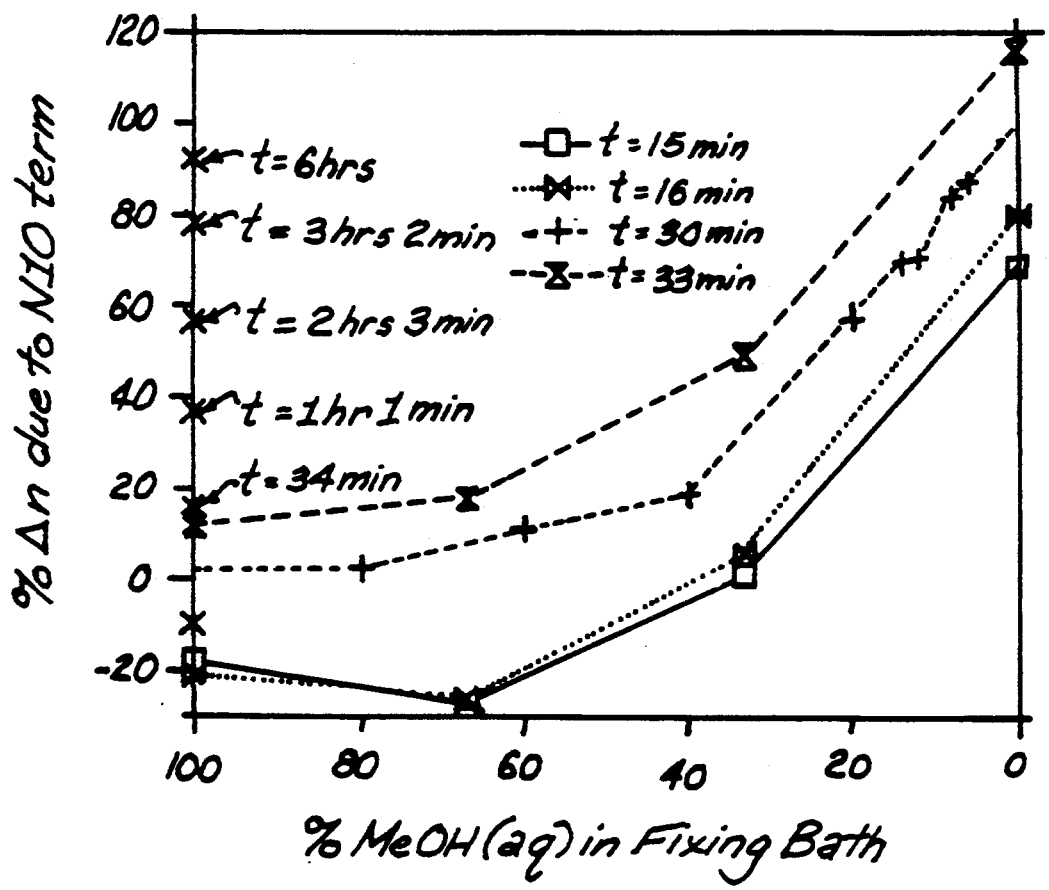
FIG. 3 is a plot of $\Delta n$ due to the $N_{10}$ term versus the volume percentage of methanol in the fixing bath as a family of curves, each for a different acid leaching time, for a titanium alkoxide:aluminum alkoxide:silicon alkoxide system having an initial molar ratio of 0.05:0.10:0.85, respectively.

A family of curves of $N_{10}$ versus the volume percentage of methanol in the fixing bath over a range of acid leaching times, for a titanium alkoxide:aluminum alkoxide:silicon alkoxide gel system having an initial molar ratio of 0.05:0.10:0.85 is shown in FIG. 2. A family of curves of % $\Delta n$ due to the $N_{10}$ term versus the volume percentage of methanol in the fixing bath, for a range of acid leaching times, for a titanium alkoxide:aluminum alkoxide:silicon alkoxide gel system having an initial molar ratio of 0.05:0.10:0.85 is shown in FIG. 3. FIGS. 2 and 3 show that glass configurations become more parabolic not only as the acid leaching time changes but also as the volume percentage of methanol in the aqueous fixing bath solution varies. Achievement of such a substantially parabolic shape becomes especially significant when the aqueous fixing bath contains 0 to 40 volume percent methanol, with little or no methanol being particularly effective. Again, by contrast, the higher $N_{10}$ values and the lower % $\Delta n$ due to the $N_{10}$ term values for the prior art's 100% methanol fixing bath show that the prior solution could not effectively produce substantially parabolic glass body configurations, except at very high leaching times of 6 to 8 hours.

The results of examples 1-23 thus demonstrate that the present invention alleviates the limitations of the prior art with respect to $\Delta n$ and glass body profile.

Although the invention has been described in detail for the purpose of illustration, it is understood that such detail is solely for that purpose and variations can be made therein by those skilled in the art without departing from the spirit and scope of the invention which is defined by the following claims.

What is claimed:

1. A method for making a gradient-index glass comprising:
   forming a mixture of a silicon alkoxide and an alcohol in a solution sufficiently acidic to partially hydrolyze the silicon alkoxide;
   adding to the mixture an index modifying metal alkoxide selected from the group consisting of alkoxides of titanium and zirconium;
   adding water to the mixture containing the index modifying metal alkoxide and the while agitating, to convert the metal alkoxides to a network of corresponding metal oxides suitable for gelation;
   molding the mixture containing the network of metal oxides for sufficient time to form a gel;
   acid leaching the molded gel for sufficient time to remove some of the index modifying metal oxide;
   fixing the gel in water or a mixture of water and alcohol;
   drying the fixed gel; and
   sintering the dried gel into a transparent gradient-index glass.

2. A method according to claim 1 further comprising:
   adding at least one additional metal alkoxide element selected from the group consisting of alkoxides of aluminum, boron, and germanium prior to said adding water.

3. A method according to claim 2 further comprising:
   washing the molded gel with water before said acid leaching.

4. A method according to claim 2, wherein the silicon alkoxide is added in an amount sufficient to produce a gradient-index glass containing 60 to 98 mole percent silicon oxide.

5. A method according to claim 2, wherein the index modifying alkoxide is added in an amount sufficient to produce a gradient-index glass containing 0.1 to 25 mole percent of corresponding index modifying oxide.

6. A method according to claim 2, wherein the additional metal alkoxide element is added in an amount sufficient to produce a gradient-index glass containing less than 25 mole percent of corresponding additional metal oxide element.

7. A method according to claim 2, wherein said acid leaching is carried out in a bath comprising water and one or more acids selected from the group consisting of hydrochloric acid, sulfuric acid, and nitric acid.

8. A method according to claim 2, wherein said fixing is carried out in water containing no alcohol.

9. A method according to claim 2, wherein said fixing is carried out in a mixture of water and an alcohol having 1 to 4 carbon atoms.

10. A method according to claim 2, wherein said fixing is carried out in a mixture of water and alcohol in a ratio maximizing $\Delta n$.

11. A method according to claim 10, wherein the mixture of water and alcohol contains 5–60 volume % alcohol.

12. A method according to claim 2, wherein said fixing is carried out in a mixture of water and alcohol which produces gradient-index glass having a substantially parabolic shape.

13. A method according to claim 12, wherein the mixture of water and alcohol for said fixing contains from 0 volume % and up to, and including, 40 volume % alcohol.

14. A method according to claim 2, wherein said fixing is carried out in a mixture of water and alcohol in a ratio maximizing $\Delta n$ and producing gradient-index glass having a substantially parabolic shape.

15. A method according to claim 14, wherein the mixture of water and alcohol contains 20–40 volume % alcohol.

16. A method according to claim 2, wherein the index modifying metal alkoxide is titanium alkoxide and the at least one additional metal alkoxide is aluminum alkoxide.

17. A method according to claim 16, wherein the glass comprises:
89 to 98 mole % $SiO_2$;
0.1 to 6 mole % $TiO_2$; and
0 to 5 mole % $\frac{1}{2}(Al_2O_3)$.

18. A method according to claim 17, wherein said fixing is carried out in a mixture of water and alcohol containing 20 to 40 volume % alcohol.

19. A method according to claim 18, wherein the mixture of water and alcohol for said fixing is 33 volume % alcohol.

20. A method for making a gradient-index glass comprising:
forming a mixture of a silicon alkoxide and an alcohol in a solution sufficiently acidic to partially hydrolyze the silicon alkoxide;
adding to the mixture an index modifying metal alkoxide selected from the group consisting of alkoxides of titanium and zirconium and at least one additional metal alkoxide element selected from the group consisting of alkoxides of aluminum, boron, and germanium;
adding water to the mixture containing the index modifying metal alkoxide and the at least one additional metal alkoxide element, while agitating, to convert the metal alkoxides to a network of corresponding metal oxides suitable for gelation;
molding the mixture containing the network of metal oxides for sufficient time to form a gel;
washing the molded gel with water;
acid leaching the washed gel for sufficient time to remove some of the index modifying metal oxide, wherein said acid leaching is carried out in a bath comprising water and one or more acids selected from the group consisting of hydrochloric acid, sulfuric acid, and nitric acid;
fixing the gel in an aqueous solution of 20–40 volume % of an alcohol having 1 to 4 carbon atoms;
drying the fixed gel; and
sintering the dried gel into a transparent gradient-index glass containing 60 to 98 mole % silicon oxide, 0.1 to 25 mole % of corresponding index modifying oxide, and less 25 mole % of corresponding additional metal oxide element.

* * * * *